United States Patent
Maestas

(10) Patent No.: US 9,374,994 B2
(45) Date of Patent: Jun. 28, 2016

(54) METHOD AND SYSTEM FOR HUMANELY DISPATCHING WOUNDED GAME

(71) Applicant: David Maestas, Los Lunas, NM (US)

(72) Inventor: David Maestas, Los Lunas, NM (US)

(*) Notice: Subject to any disclaimer, the term of this patent is extended or adjusted under 35 U.S.C. 154(b) by 288 days.

(21) Appl. No.: 14/060,359

(22) Filed: Oct. 22, 2013

(65) Prior Publication Data

US 2015/0111481 A1 Apr. 23, 2015

(51) Int. Cl.
*A22B 3/00* (2006.01)
*A01M 31/00* (2006.01)

(52) U.S. Cl.
CPC ...................... *A01M 31/00* (2013.01)

(58) Field of Classification Search
CPC ............... A22B 3/00; A22B 2/10; A22B 3/13
USPC .................. 452/65, 102–105, 1–12
See application file for complete search history.

(56) References Cited

U.S. PATENT DOCUMENTS

| | | | |
|---|---|---|---|
| 1,503,372 A | 7/1924 | Pacholke | |
| 1,580,790 A | 4/1926 | MacAllister | |
| 2,081,229 A | 5/1937 | Fisher et al. | |
| 2,434,587 A | 1/1948 | Riordan | |
| 3,991,466 A * | 11/1976 | Smith | A47G 21/065 30/149 |
| 4,127,919 A | 12/1978 | Buddecke | |
| 4,551,886 A * | 11/1985 | Couche | A47G 21/065 452/17 |
| 4,553,287 A * | 11/1985 | DeSordi | A22C 29/024 452/3 |
| 4,601,102 A * | 7/1986 | Phillips | B26B 29/02 30/123.5 |
| 5,290,186 A * | 3/1994 | Juranitch | B26B 13/16 30/252 |
| 5,613,904 A * | 3/1997 | LaSalle | A22C 29/024 30/120.1 |
| 6,183,356 B1 | 2/2001 | Middleton et al. | |
| 6,450,871 B1 * | 9/2002 | Morrison, Jr. | A22C 25/006 452/1 |
| 7,024,777 B1 * | 4/2006 | Bach | A47G 21/061 30/120.1 |
| 7,125,329 B2 * | 10/2006 | Mindes | A22C 29/024 452/3 |
| 7,402,099 B1 | 7/2008 | Parvin | |
| 7,578,731 B1 * | 8/2009 | Moore | A22B 5/0047 452/103 |
| 8,308,534 B1 | 11/2012 | Amesbury | |
| 2013/0023190 A1 | 1/2013 | Evans | |

\* cited by examiner

*Primary Examiner* — Richard Price, Jr.
(74) *Attorney, Agent, or Firm* — Kevin Soules; Luis M. Ortiz; Kermit D. Lopez

(57) ABSTRACT

A method, system, and apparatus for humanely dispatching wounded game in the field comprises a shank with a connecting end, a curved region, and a pointed end connected to a grip formed at the connecting end of the shank. The grip includes a front surface, a rear surface and a lip formed along the forward edge of the grip. The apparatus, and specifically the curved region in the shank, is configured to allow the pointed end of the shank to penetrate a target below the target's skull and, upon continued insertion, penetrate the brain/brain stem of the target thereby humanely dispatching the target.

14 Claims, 4 Drawing Sheets

METHOD AND SYSTEM FOR HUMANELY DISPATCHING WOUNDED GAME

TECHNICAL FIELD

Embodiments are generally related to the field of hunting tools. More particularly, embodiments relate to methods and systems for humanely dispatching game wounded in the field.

BACKGROUND OF THE INVENTION

It is common for a hunter's first attempt to bag game to result in the mortal wounding of the game without causing its immediate death. This is particularly true when hunting upland game, waterfowl, and other such game where a shotgun is the primary weapon. In such cases, the game fowl is often struck by a sufficient number of pellets to ensure its ultimate demise. However, the bird is often wounded, but alive when the hunter arrives to retrieve the game. Thus, it would be advantageous to have a tool for quickly dispatching wounded game once it is retrieved.

Prior art methods for dispatching fowl are commonly centered on crushing the bird's head with a vice, pliers, or other such device. However, such devices are archaic, cause the wounded game unnecessary pain, can cause an unwanted mess, and can be difficult to carry in the field. Therefore, a need exists for a portable, humane, tool for dispatching fowl that can be easily taken into the field.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a tool.

It is another aspect of the disclosed embodiments to provide for an enhanced method, apparatus, and system for dispatching wounded game.

It is another aspect of the disclosed embodiments to provide an enhanced apparatus, method, and system for a portable tool for quickly and humanely dispatching wounded game in the field.

The aforementioned aspects and other objectives and advantages can now be achieved as described herein. An apparatus comprising a shank with a connecting end, a curved region, and a pointed end is connected to a grip formed at the connecting end of the shank. The grip includes a front surface, a rear surface and a lip formed along the forward edge of the front side and rear side of the grip. The apparatus and specifically the curved region in the shank is configured to allow the pointed end of the shank to penetrate a target below the target's skull and, upon continued insertion, penetrate the brain/brain stem of said target thereby humanely dispatching the target.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof. Various modifications to the preferred embodiments, disclosed herein, will be readily apparent to those of ordinary skill in the art and the disclosure set forth herein may be applicable to other embodiments and applications without departing from the spirit and scope of the present specification and the claims hereto appended. Thus, the present specification is not intended to be limited to the embodiments described, but is to be accorded the broadest scope consistent with the disclosure set forth herein.

Figure 1:
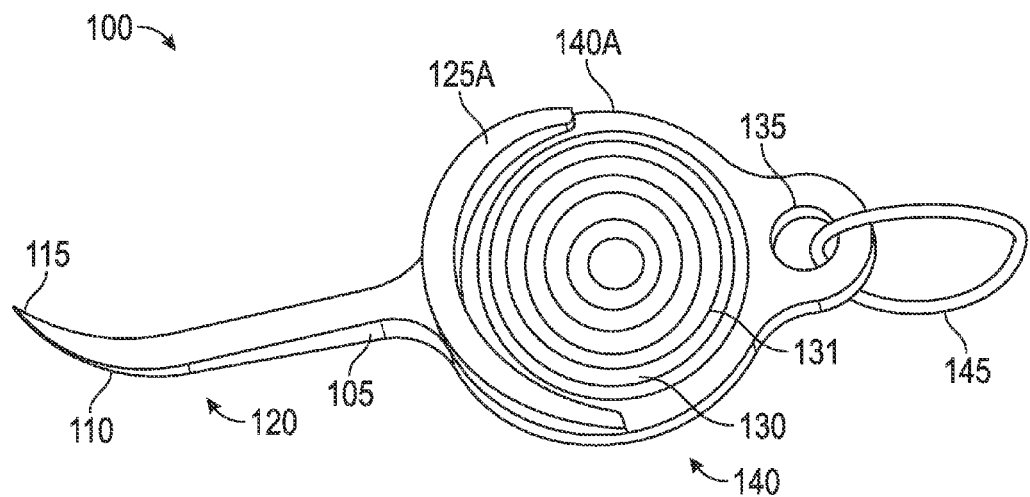
FIG. 1 depicts a tool for dispatching wounded game in the field.
Figure 1A:
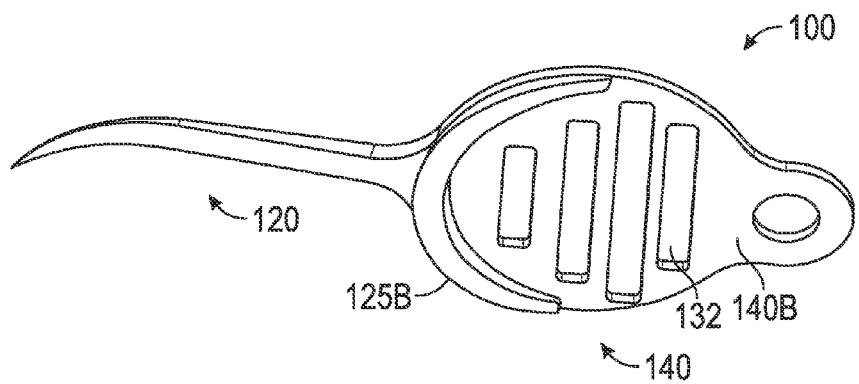
FIG. 1A depicts a reverse side of a tool for dispatching wounded game in the field.

FIG. 1 and FIG. 1A illustrate a portable tool 100 for humanely dispatching wounded game. Hunting enthusiasts commonly encounter a situation where a target is wounded. Such situations require the hunter to quickly dispatch the wounded game. However, traditionally the game is killed manually, or by using tools that crush the targets skull. These methods are unsatisfactory because they are often messy and cause significant damage to the animal's carcass. Such destruction is not desirable if the target is to be used, for example, in dog training where a headless body is not useful. Likewise, the hunter may wish to preserve the entire body in tact for various other reasons.

Tool 100 fills this need by providing a portable utility that can be carried into the field, to quickly dispatch wounded game. Tool 100 includes a shank 120. Shank 120 is formed with a pointed end 115 that is configured to pierce the wounded game on the back of the head, just below the skull. Shank 120 includes a curved region 110 and a connecting end 105.

The curved region 110 of shank 120 is specifically configured so that after the pointed end 115 is inserted below the skull, the continued insertion of the shank 120 drives the pointed end 115 upward into the wounded game's brain and/or brain stem, thereby quickly and humanely dispatching the target. Thus, the angle of curved region 110 is critical. The angle of curved region 110 is preferably between 20 and 80 degrees, and may be selected to suit a specific target. For example a more dramatic angle may be required for game with a larger head, longer neck, or other such anatomical feature. The angle of curved region 110 can therefore be selected to match the anatomy of the game the hunter is hunting.

Shank 120 can be formed with a tapered rectangular shape. Shank 120 is tapered so that pointed end 115 terminates in a sharp point. Alternatively shank 120 can be formed with a tapered tubular shape as shown in FIGS. 3a-3G below.

Figure 2:
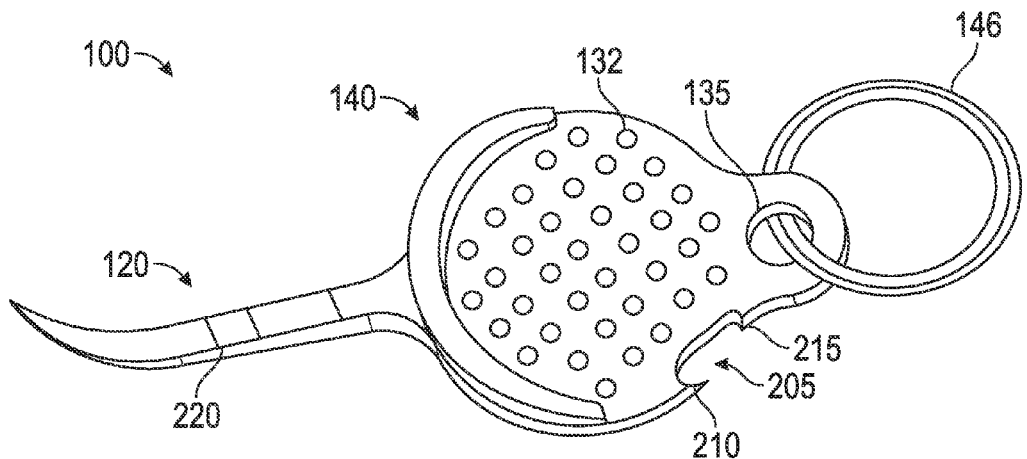
FIG. 2 depicts an alternative embodiment of an apparatus and system for dispatching wounded game in the field.

In a preferred embodiment shank 120 is formed from a plastic polymer, wood, aluminum, or other metal, or a combination thereof. It should be appreciated that the tool can be used in conjunction with game fowl, dove, quail, ducks, geese, snipe, pigeon, chickens, turkey, fish and other species of game. In addition, the length of the shank and the size of the grip may be altered to fit the specific anatomy of the game upon which the tool is intended to be used. This may include providing markings on a "one size fits all" version of the shank 120 that indicates to the user roughly how deep the shank 120 needs to be inserted in order to effectively reach the brain/brain stem of a variety of different game animals. Such markings are shown in FIG. 2 as markings 220. Markings 220 can be color coded and/or labeled to identify the game species the mark is associated with. This provides the user a metric for how deep the tool should be inserted for that species.

Connecting end 105 of the shank 120 is connected to grip 140. Grip 140 is intended to be grasped between the thumb and index fingers. Grip 140 includes a front surface 140A and rear surface 140B (shown in FIG. 1A of the reverse side of tool 100). The front side of front surface 140A includes a lip 125A and the front side of rear surface 140B includes lip 125B. Lips 125 A and 125 B prevent the users fingers from slipping off the grip 140. Grip 140 also includes a hole 135 formed to accept a retaining device 145, such as a lanyard or key chain ring. This allows a user to easily connect tool 100 to a belt, boot, gun, backpack, or other clothing article via the retaining device 145 so that the tool 100 can be easily carded into the field. In an alternative embodiment retaining device 145 can have an elastic property or otherwise be configured with a retractable cord so that the tool 100 can be pulled away from the user for use in the field without being removed from its connection to the user when it is used.

Grip 140 can be comprised of a sub-structure such as a plastic polymer, wood, metal such as aluminum, or the like, with a rubber coating 130 formed over the sub-structure. The grip 140 can include a plurality of ridges comprising parallel raised ridges 132, parallel sunken ridges, concentrically raised rings 131, dimples, or the like to promote a user's grip and prevent slippage. It should be appreciated that any combination of ridges, rings, dimples, or the like can be included on the front surface 140A and/or rear surface 140B, so as to best facilitate the user's grip.

FIG. 2 illustrates an alternative embodiment of tool 100. It should be noted that equivalent or similar features throughout the figures are labeled with the same reference numerals. In the preferred embodiment illustrated in FIG. 2, tool 100 includes a plurality of raised dimples 132 to prevent a user's fingers from slipping off of grip 140. Furthermore, in an alternative embodiment, grip 140 can further include a bottle opener, which comprises a cutout 205 in the back of grip 140 with a flat side 215 and a lip 210. FIG. 2 also illustrates a further alternative embodiment wherein a key ring 146 is connected to hole 135 of the tool 100.

Figure 3A:
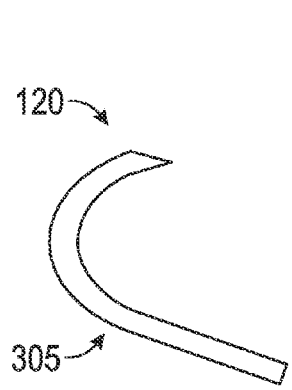
FIG. 3A depicts an exploded view of a pointed end comprising a hook associated with a tool for dispatching wounded game in the field in accordance with an alternative embodiment.
Figure 3B:
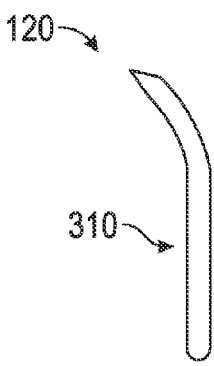
FIG. 3B depicts an exploded view of a pointed end comprising a left twist associated with a tool for dispatching wounded game in the field in accordance with an alternative embodiment.
Figures 3C, 3D:
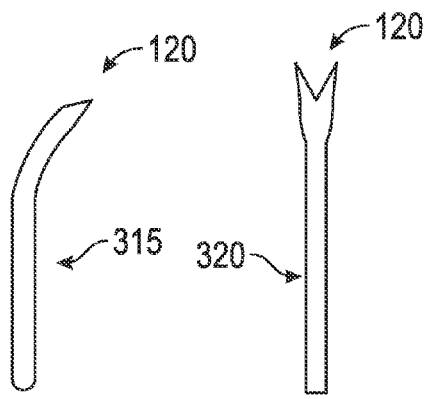
FIG. 3C depicts an exploded view of a pointed end comprising a right twist associated with a tool for dispatching wounded game in the field in accordance with an alternative embodiment.
FIG. 3D depicts an exploded view of a pointed end comprising a split-v tip associated with a tool for dispatching wounded game in the field in accordance with an alternative embodiment.
Figure 3E:
FIG. 3E depicts an exploded view of a pointed end comprising a straight tip associated with a tool for dispatching wounded game in the field in accordance with an alternative embodiment.
Figure 3F:
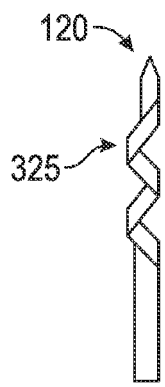
FIG. 3F depicts an exploded view of a pointed end comprising a spiral tip associated with a tool for dispatching wounded game in the field in accordance with an alternative embodiment.
Figure 3G:
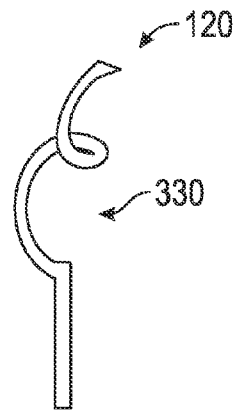
FIG. 3G depicts an exploded view of a pointed end comprising a loose corkscrew tip associated with a tool for dispatching wounded game in the field in accordance with an alternative embodiment.

FIGS. 3A-3G illustrate a set of shanks 120 each of which can be used in accordance with an alternative embodiment of the invention. For example, FIG. 3A illustrates a hook curved region 305 of a shank 120. Likewise, FIG. 3B shows a left twisted curved region 310 of a shank 120. FIG. 3C shows a right twisted curved region 315 of shank 120. FIG. 3D illustrates an alternative embodiment wherein shank 120 includes a v-split pointed end 320. The v-split illustrated in FIG. 3D may be sharp so that as the v-split point end 320 encounters obstructions within the target, it is capable of cutting or severing such obstructions (such as, for example, the target's brain or brainstem, spinal cord, etc.) further aiding in the humane and immediate death of the target. FIG. 3E illustrates a straight shank 120. FIG. 3F displays a spiraled region 325 of shank 120. It should be appreciated with respect to spiraled region 325 that this spiral could be advantageously included in a curved shank such as curved region 110 as shown in FIG. 1. Finally, FIG. 3G illustrates a loose corkscrew region 330 of a shank 120.

It should be appreciated that while FIGS. 3A-3G illustrate a shank embodied as tubular and/or tapered, such shanks could further be configured with a tapered and/or rectangular shaped shank, as shown in FIG. 1. Furthermore, each of FIGS. 3A-3G could alternatively be used as shank 120.

Figure 4:
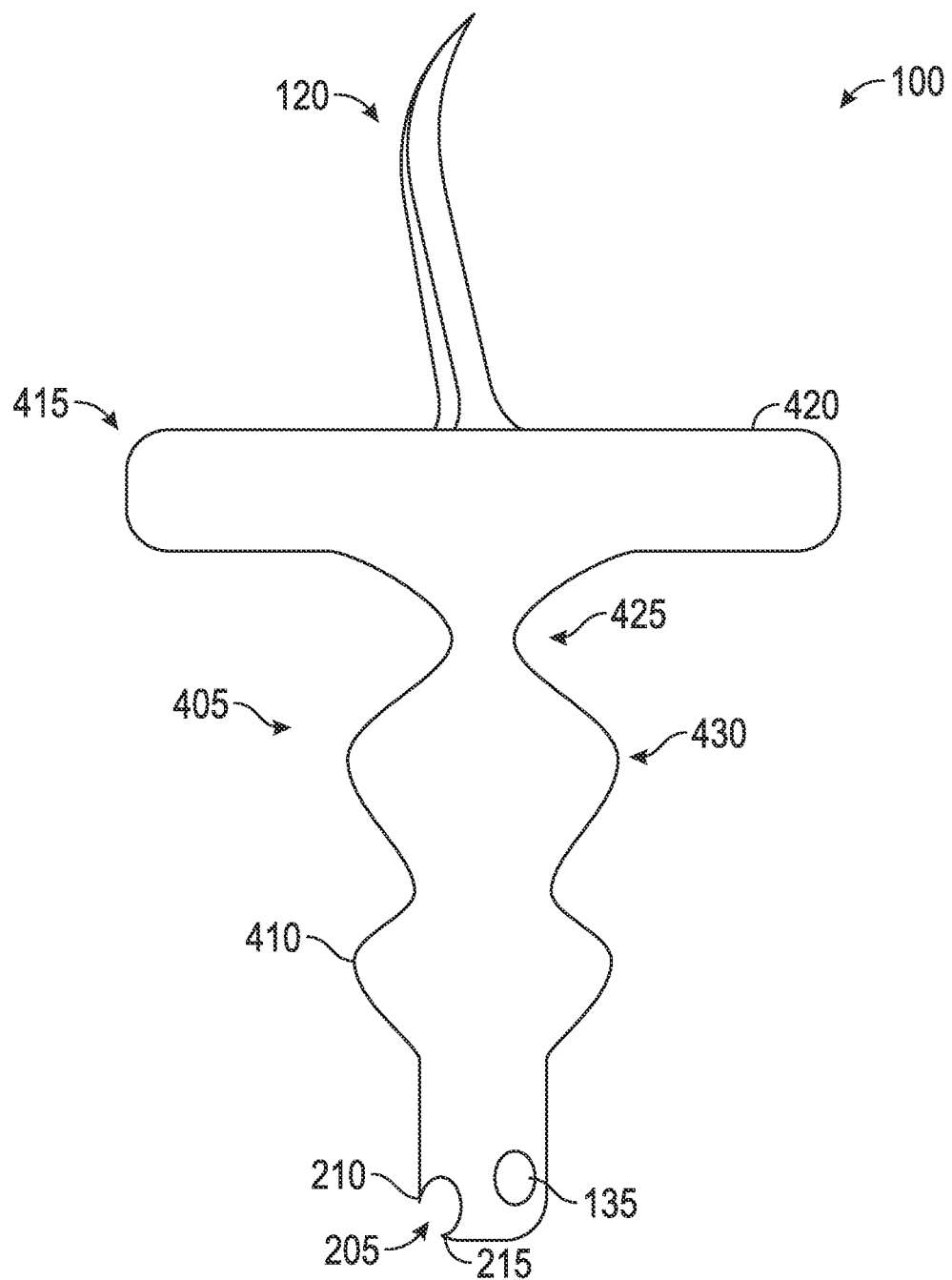
FIG. 4 depicts an exploded view of an alternative grip associated with a tool for dispatching wounded game in the field in accordance with an alternative embodiment.

FIG. 4 illustrates an alternative embodiment of the tool 100. In this embodiment grip 140 is replaced with a handle 405. Handle 405 is included to be grasped by a wrapping ones fingers around finger grip region 410. Grip 140 includes a finger guard 415, comprising a lateral member 420 affixed to shank 120 such that the lateral member shields the users fingers and hand from the target.

Finger grip region 410 is configured to fit users fingers with a series of indentions 425 and protrusions 430 intended to provide the user a comfortable and ergonomic grip of handle 405.

It should be appreciated that tool 100 illustrated in FIG. 4 could be advantageously arranged with any of the shanks 120 illustrated in FIGS. 3A-3G. Furthermore, handle 405 shown in FIG. 4 can include a hole 135 formed to accept a retaining device such as retaining device 145 shown in FIG. 1. This allows a user to easily connect tool 100 to a belt, boot, gun, backpack, or other clothing article via the retaining device 145 so that the tool 100 can be easily carried into the field.

Handle 405 can be comprised of a sub-structure such as a plastic polymer, metal, or the like, with a rubber coating, such as coating 130 shown in FIG. 1, formed over the sub-structure. The grip 140 can include a plurality of ridges, dimples, or the like to promote a user's grip and prevent slippage. Furthermore, In an alternative embodiment, handle 405 can include a bottle opener which comprises a cutout 205 at the end of handle 405 with a flat side 215 and a lip 210.

Figure 5:
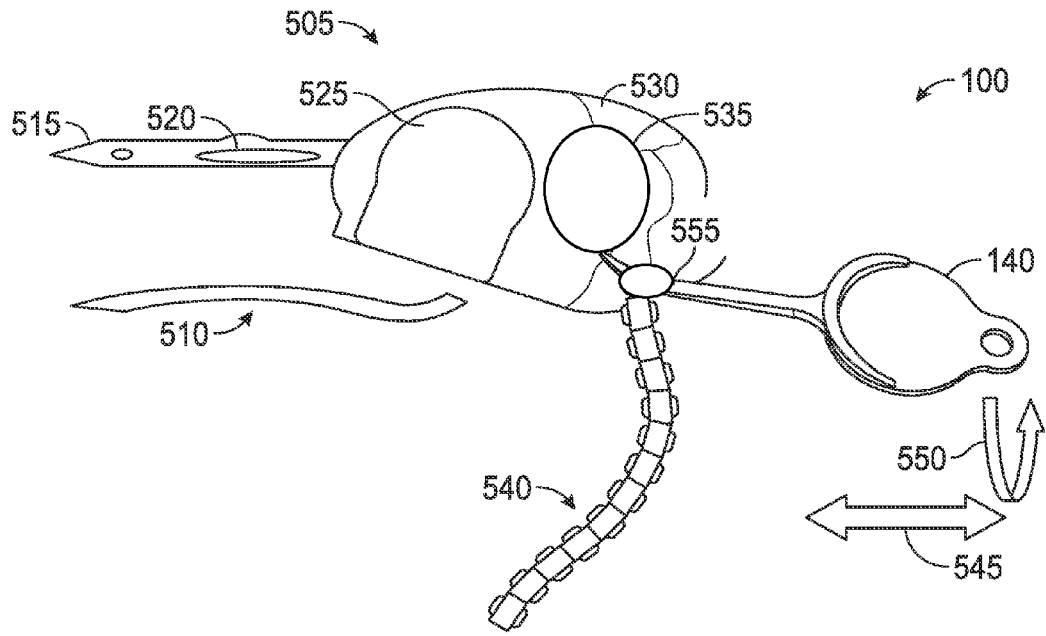
FIG. 5 depicts a tool being used to dispatch wounded game in the field in accordance with an alternative embodiment.

FIG. 5 illustrates the tool 100 inserted in the brain and/or brain stem 535 of a target 505 in accordance with another alternative embodiment. FIG. 5 illustrates an embodiment wherein tool 100 is being used to humanly dispatch game fowl. However, it should be appreciated that tool 100 may also be used to dispatch a target including a large variety of game including small mammals, fish, amphibians, and birds. In general, target 505 may have an anatomy comprising an upper beak 515, lower beak 510, nasal orifice 520, orbital region 525, brain case 530, brain/brainstem 535, and vertebrae 540.

Generally, grip 140 of tool 100 can be maneuvered laterally as shown by arrow 545. Maneuvering grip 140, causes shank 120 to enter the target below the skull at 555 and then penetrate the target's brain/brainstem 535 with pointed end 115. It should be appreciated that the curved region 110 of tool 100 allows the lateral movement of the grip 140 to impart a lateral movement in shank 120 that is translated into an upward motion of pointed end 115, thus penetrating the brain/brain stem from below, without requiring the targets head to be crushed. Once pointed end 115 penetrates the target's brain 535, the target is quickly and humanely dispatched.

Grip 140, and tool 100, can also be moved rotationally as shown by arrow 550, during or after the tool 100 has been inserted into the target. Rotational motion 550 can help incur catastrophic damage to the targets brain/brainstem 535, to ensure the target is swiftly and humanely dispatched.

Figure 6:
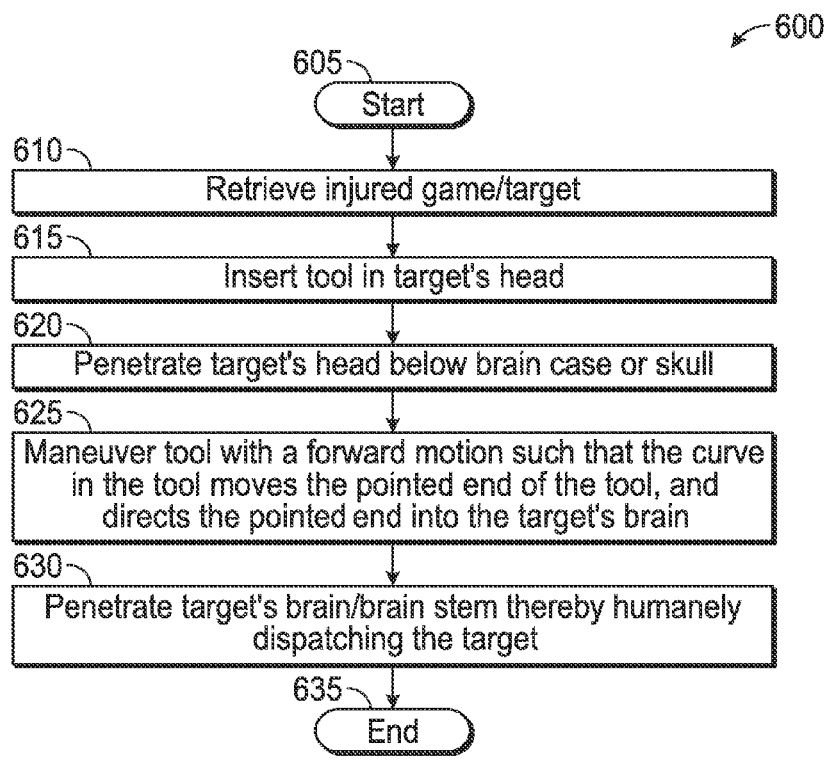
FIG. 6 depicts a flow chart depicting logical operational steps associated with a method of dispatching wounded game in the field in accordance with an alternative embodiment.

FIG. 6 illustrates a set of logical operational steps 600 for quickly and humanly dispatching game in the filed using a tool such as tool 100 shown above. The method starts at 605.

At block 610 the hunter, retrieves game that has been wounded in the field. The tool 100 is then inserted into the wounded game, preferably in the back of the targets head as in 615, and below the targets brain case as illustrated at 620. Next the user laterally maneuvers the tool 100 such that the curved region of the shank directs the pointed end of the shank into the targets brain or brain stem, as described at 625. Finally, at block 630 the targets brain is penetrated and the wounded game is therefore quickly and humanely dispatched. The method ends at 635.

Based on the foregoing, it can be appreciated that a number of embodiments, preferred and alternative, are disclosed herein. For example, in one embodiment, an apparatus comprising a shank comprising a connecting end, a curved region, and a pointed end is disclosed. The Apparatus further comprises a grip formed at the connecting end of the shank comprising a front surface and a rear surface, and a lip formed along a forward edge of said front side of said grip. The curved region in the shank is configured to allow the pointed end of the shank to penetrate a target below the target's skull and, upon continued insertion, penetrate a brain of the target thereby humanely dispatching the target.

In another embodiment the grip of the apparatus further comprise a metal structure formed at the connecting end of said shank, at least one voided region configured in the metal sub-structure to accept a retaining member for attachment to said retaining member, and a rubber coating covering the front surface and the rear surface of said grip. The rubber coating covering the front surface of the grip and the rear surface of the grip further comprises a plurality of ridges configured to prevent slipping.

In another embodiment the metal sub-structure further comprises a cutout region comprising a flat wall and a lip formed on the rear surface of the metal sub-structure configured to open a bottle.

In yet another alternative embodiment the apparatus and specifically the pointed end of the shank further comprises one of a left twist, a right twist, a loose corkscrew tip, a hook tip, a straight tip, a spiral tip, and a split-v tip. Additionally, the apparatus is further configured wherein the shank comprises at least two prongs originating at a split at the connecting end of the shank such that each of the at least two prongs further comprise a curve and a pointed end.

In another alternative embodiment a method for dispatching game comprises collecting a target, inserting a tool into the target wherein the tool comprises: a shank comprising a curved region, a connecting end, and a pointed end; a grip formed at said connecting end of the shank comprising a front surface and a rear surface; and a lip formed along a forward edge of the front side of the grip. The method includes inserting the pointed end of the shank below the targets skull and further inserting the shank such that the curved region in the shank allows the pointed end of the shank to penetrate a brain of the target thereby humanely dispatching the target.

The method can further comprise forming the grip as a metal sub-structure at the connecting end of the shank. The method includes forming at least one voided region in the metal sub-structure configured to accept a retaining member for attaching a retaining member, and forming a rubber coating covering the front surface and the rear surface of the grip. The rubber coating may be configured with a plurality of ridges configured to prevent slipping.

In an alternative embodiment the method further comprises forming the metal sub-structure to comprise a cutout region comprising a flat wall and a lip formed on the rear surface of the metal sub-structure configured to open a bottle.

In another alternative embodiment the method further comprises forming the pointed end with at least one of: a left twist, a right twist, a loose corkscrew tip, a hook tip, a straight tip, a spiral tip, and a split-v tip.

In yet another alternative embodiment the method further comprises forming the shank with at least two prongs originating at a split at the connecting end of the shank such that each of the at least two prongs further comprise a curved region and a pointed end.

In another embodiment A system comprises a shank comprising a connecting end, a curved region, and a pointed end; a grip formed at the connecting end of the shank comprising a front surface and a rear surface; and a lip formed along a forward edge of the front side of the grip. The curved region in the shank is configured to allow the pointed end of the shank to penetrate a target below the target's skull and, upon continued insertion, penetrate a brain of the target thereby humanely dispatching the target.

In yet another embodiment the system the grip of the system further comprises a metal sub-structure formed at the connecting end of the shank and at least one voided region configured in the metal sub-structure to accept a retaining member for attachment to a retaining member. A rubber coating covers the front surface and the rear surface of the grip. The rubber coating covering the front surface of the grip and the rear surface of the grip further comprises a plurality of ridges configured to prevent slipping.

In an alternative embodiment the metal sub-structure further comprises a cutout region comprising a flat wall and a lip formed on the rear surface of the metal sub-structure configured to open a bottle.

In yet another embodiment, the pointed end of the shank further comprises one of: a left twist, a right twist, a loose corkscrew tip, a hook tip, a straight tip, a spiral tip, and a split-v tip.

The shank may also comprise at least two prongs originating at a split at the connecting end of the shank such that each of the at least two prongs further comprise a curve and a pointed end.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An apparatus consisting of:
   a shank comprising a connecting end, a curved region, and a pointed end adapted to penetrate an avian cranial cavity;
   a finger grip formed at said connecting end of said shank comprising a generally thumb print sized gripping front surface and an index finger gripping rear surface; and
   a lip partially formed along a forward edge of said finger grip.

2. The apparatus of claim 1 wherein said curved region in said shank is configured to allow said pointed end of said shank to penetrate a point below said avian cranial cavity and, upon continued insertion, penetrate a brain in said avian cranial cavity.

3. The apparatus of claim 1 wherein said finger grip further comprises:
   a sub-structure formed to connect to said connecting end of said shank;
   at least one voided region configured in said sub-structure to accept a retaining member for attachment to said retaining member; and
   a rubber coating covering said generally thumb print sized gripping front surface and said index finger gripping rear surface of said finger grip.

4. The apparatus of claim 3 wherein said rubber coating covering said generally thumb print sized gripping front surface and said index finger gripping rear surface of said finger grip further comprises a plurality of ridges configured to prevent slipping.

5. The apparatus of claim 3 wherein said sub-structure further comprises a cutout region comprising a flat wall and a lip formed on a side of said sub-structure configured to open a bottle.

6. The apparatus of claim 1 wherein said pointed end further comprises one of:
   a left twist;
   a right twist;
   a loose corkscrew tip;
   a hook tip;
   a straight tip;
   a spiral tip; and
   a split-v tip.

7. The apparatus of claim 1 wherein said shank comprises at least two prongs originating at a split at said connecting end of said shank such that each of said at least two prongs further comprise a curve and a pointed end.

8. A system consisting of:
   a shank comprising a connecting end, a curved region, and a pointed end adapted to penetrate an avian cranial cavity;
   a finger grip formed at said connecting end of said shank comprising a generally thumb print sized gripping front surface and an index finger gripping rear surface; and
   a lip partially formed along a forward edge of said finger grip.

9. The system of claim 8 wherein said curved region in said shank is configured to allow said pointed end of said shank to penetrate a point below said avian cranial cavity and, upon continued insertion, penetrate a brain in said avian cranial cavity.

10. The system of claim 8 wherein said finger grip further comprises:
    a metal sub-structure connected to said connecting end of said shank;
    at least one voided region configured in said metal sub-structure to accept a retaining member for attachment to a retaining member; and
    a rubber coating covering said generally thumb print sized gripping front surface and said index finger gripping rear surface of said metal sub-structure of said finger grip.

11. The system of claim 10 wherein said rubber coating covering said generally thumb print sized gripping front surface of said finger grip and said index finger gripping rear surface of said finger grip further comprises a plurality of ridges configured to prevent slipping.

12. The system of claim 10 wherein said metal sub-structure further comprises a cutout region comprising a flat wall and a lip formed on a side of said metal sub-structure configured to open a bottle.

13. The system of claim 8 wherein said pointed end further comprises one of:
    a left twist;
    a right twist;
    a loose corkscrew tip;
    a hook tip;
    a straight tip;
    a spiral tip; and
    a split-v tip.

14. The system of claim 8 wherein said shank comprises at least two prongs originating at a split at said connecting end of said shank such that each of said at least two prongs further comprise a curve and a pointed end.

* * * * *